(12) United States Patent
Schindler et al.

(10) Patent No.: US 7,160,927 B2
(45) Date of Patent: Jan. 9, 2007

(54) SULFONATED ARYL SULFONATE MATRICES AND METHOD OF PRODUCTION

(76) Inventors: Bernd Schindler, Postschulenweg 4, Stuttgart (DE) 70569; Richard McDonogh, 3660 Cielo Del Mar, San Diego, CA (US) 92130

( * ) Notice: Subject to any disclaimer, the term of this patent is extended or adjusted under 35 U.S.C. 154(b) by 344 days.

(21) Appl. No.: 10/666,893

(22) Filed: Sep. 17, 2003

(65) Prior Publication Data

US 2004/0054125 A1 Mar. 18, 2004

Related U.S. Application Data

(63) Continuation of application No. 09/563,143, filed on May 2, 2000, now abandoned.

(51) Int. Cl.
*C08J 5/20* (2006.01)
(52) U.S. Cl. .......................... 521/27; 525/344
(58) Field of Classification Search ................ 521/27; 525/344
See application file for complete search history.

(56) References Cited

U.S. PATENT DOCUMENTS

| | | | |
|---|---|---|---|
| 3,709,841 A | 1/1973 | Quentin | |
| 3,769,332 A | 10/1973 | Nagayama et al. | |
| 3,855,122 A | 12/1974 | Bourganel | |
| 3,869,429 A | 3/1975 | Blades | |
| 4,026,977 A | 5/1977 | Bourganel | |
| 4,054,707 A | 10/1977 | Quentin | |
| 4,207,182 A | 6/1980 | Marze | |
| 4,268,650 A | 5/1981 | Rose | |
| 4,273,903 A | 6/1981 | Rose | |
| 4,419,486 A | 12/1983 | Rose | |
| 4,634,530 A | 1/1987 | Kuder et al. | |
| 4,714,725 A | 12/1987 | Hendy et al. | |
| 4,818,387 A | 4/1989 | Ikeda et al. | |
| 4,866,099 A | 9/1989 | Hendy | |
| 4,920,193 A | 4/1990 | Hann et al. | |
| 4,922,485 A | 5/1990 | Quinquis et al. | |
| 4,939,180 A | 7/1990 | Hendy | |
| 4,941,893 A | 7/1990 | Hsieh et al. | |
| 4,954,143 A * | 9/1990 | Scott et al. .................... | 95/50 |
| 4,971,695 A | 11/1990 | Kawakami et al. | |
| 4,992,485 A | 2/1991 | Koo et al. | |
| 5,008,352 A | 4/1991 | Hendy | |
| 5,013,765 A | 5/1991 | Sluma et al. | |
| 5,028,337 A | 7/1991 | Linder et al. | |
| 5,030,672 A | 7/1991 | Hann et al. | |
| 5,071,448 A | 12/1991 | Bikson et al. | |
| 5,112,892 A | 5/1992 | Cardew et al. | |
| 5,118,766 A | 6/1992 | Hendy et al. | |
| 5,246,582 A | 9/1993 | Sluma et al. | |
| 5,401,410 A | 3/1995 | Bell et al. | |
| 5,693,740 A | 12/1997 | Colquhoun et al. | |
| 5,879,554 A | 3/1999 | Loffelmann et al. | |
| 5,997,741 A | 12/1999 | Shimoda et al. | |
| 6,258,272 B1 * | 7/2001 | Wang et al. ............ | 210/500.41 |

FOREIGN PATENT DOCUMENTS

| | | |
|---|---|---|
| DE | 3321860 A1 | 12/1984 |
| DE | 3814759 A1 | 11/1989 |
| DE | 3814760 A1 | 11/1989 |
| EP | 0 145 305 A2 | 6/1985 |
| EP | 0 165 007 B1 | 12/1985 |
| EP | 0 165 077 A2 | 12/1985 |

OTHER PUBLICATIONS

PCT International Search Report; PCT/US 01/40640.
Abstract; Derwent Publications Ltd., London, GB; AN 1990-294967; XP002181229 & JP 02 208322 A ((KURK) Kurita Water Ind. Ltd.), Aug. 17, 1990.
Maku (Membrane), 1992, Vo. 17, No. 2, p. 85-90, Fig. 7, Tbl. 2, Ref. 4.
Maku (Membrane), 1992, vol. 17, No. 2, p. 78-84, Fig. 6, Tbl. 3, Ref. 3.
Maku (Membrane), 1992, vol. 17, No. 3, p. 179-192, Fig. 25, Tbl. 5, Ref. 9.

* cited by examiner

*Primary Examiner*—Bernard Lipman
(74) *Attorney, Agent, or Firm*—Knobbe Martens Olson & Bear LLP

(57) ABSTRACT

Porous matrices and membrane matrices comprising sulfonated aryl sulfonate polymers are prepared from a sulfonated aryl sulfonate polymer solution which is made by dissolving an aryl sulfonate polymer, and optionally a polymer other than aryl sulfonate, in a sulfonating acid solvent such as sulfuric acid. The solutions are then cast as wet films from which the matrices are coagulated. By controlling composition and process parameters, hydrophilic matrices of varying morphology are produced.

21 Claims, 4 Drawing Sheets

SULFONATED ARYL SULFONATE MATRICES AND METHOD OF PRODUCTION

RELATED APPLICATION

This application is a continuation of application Ser. No. 09/563,143, filed May 2, 2000 now abandoned.

FIELD OF THE INVENTION

The present invention relates to matrices comprising sulfonated aryl sulfonate polymers and methods for preparing them. In particular, the invention relates to the use of a sulfonating solvent to make a sulfonated aryl sulfonate polymer solution, which is then cast as a wet film from which the matrix is coagulated.

BACKGROUND OF THE INVENTION

Polymeric matrices, including porous matrices and membrane matrices, are well known in the art. Membrane matrices are used in a variety of filtration applications, such as purification and testing in the food and beverage industry, water treatment, pharmaceuticals, and in medical laboratories. Porous matrices have become increasingly relevant to the testing industry for uses including medical diagnostics, e.g., glucose monitoring test strips.

Most polymeric matrices are generally made by first preparing a casting solution made up of the chosen polymer in a suitable solvent. The casting dope is then formed into a thin sheet and the polymer is precipitated or coagulated into a solid phase. Precipitating or coagulating the polymer into a solid porous matrix or membrane matrix is normally carried out by evaporating the solvent or contacting the polymer with a non-solvent liquid in a coagulation bath. By varying the composition of the polymer or casting solution, or the process conditions, matrices having varying morphology, porosity, and performance characteristics are produced.

In producing the matrices of the present invention, various technologies come into play. These include the dissolution of polymers in sulfonating solvents, the use of sulfonated polymers to make matrices, and the use of acid-type solvents for making matrices.

The dissolution of polymers, including aryl ether ketone, aryl sulfonates and aramid type polymers (e.g., polysulfone, polyethersulfone, polyetherketone, poly-paraphenylene terephthalamide), in sulfonating solvents has been disclosed. For example, phase diagrams for Kevlar™ (poly-paraphenylene terephthalamide, or PPTA) in sulfuric acid are available in "Polymeric Materials Encyclopedia" from CRC Press. The original method for the making of Kevlar™ fibers involved the dissolution of the polymer in concentrated sulfuric acid. The problem of the degradation of the material in sulfuric acid is discussed in the literature in general.

The use of sulfuric acid on a polymer to induce such a "degradation", i.e. to sulfonate the polymer, is reported in patents assigned to Akzo and ICI (U.S. Pat. No. 4,992,485 and DE-3321860). These patents disclose a process for preparing a sulfonated polymer, which is collected after sulfonation for further use. In U.S. Pat. No. 4,419,486 (EP-8894), a hydrophilic sulfonated polyaryletherketone polymer is derived by controllably sulfonating a copolymer. The sulfonation may be effected using 98% w/w concentrated sulfuric acid at an elevated temperature. The sulfonation of aromatic polyether sulfones by means of sulfur trioxide in concentrated sulfuric acid as solvent is disclosed in U.S. Pat. No. 5,013,765 (EP-341473). Side reactions and degradation reactions may be suppressed to a large extent by maintaining a sulfur trioxide content of less than 6 percent by weight, based on the solvent, and a reaction temperature of less than 30° C.

The use of sulfonated polymers to make membranes has been reported by Rhone-Poulenc, ICI and Akzo. In all such cases, a mixture of sulfonated and non-sulfonated polymer is used to make hydrophilic membranes. Typical solvents used include dimethylformamide, however, there is no mention of sulfonating solvents.

In U.S. Pat. No. 4,207,182, a mixture of at least one non-sulfonated polysulfone and at least one sulfonated polysulfone is disclosed. The mixture consists of 10 to 30% by weight of a sulfonated polysulfone which has a theoretical ion exchange capacity of from 500 to 1,200 meq/kg. Semi-permeable membranes may be obtained from such mixtures using relatively concentrated solutions of the mixtures. The resulting membranes are disclosed as being particularly suitable for use in ultrafiltration.

Sulfonated polysulfone composite semipermeable membranes and a process for their production is disclosed in EP 165,077 A2. A polysulfone ultrafiltration membrane is used as the basic material to make a thin film, composite reverse osmosis membrane from a solution of previously sulfonated polysulfone by dissolving the sulfonated polysulfone and other components in a volatile solvent (e.g., ethylene glycol monomethyl ether), then letting the wet film dry to form a selective layer on the ultrafiltration membrane.

U.S. Pat. No. 4,714,725 relates to the production of asymmetric semipermeable membranes prepared using solutions of sulfonated polyaryletherketones in a solvent mixture of at least three liquids or low melting solids which are non-solvents or poor solvents for the polymer. The polymer may contain unsulfonated and sulfonated phenylene residues. The components of the solvent mixture have specified solubility parameters. Specifically disclosed is a solvent mixture formed from water, 1,4-dioxane and acetonitrile.

Synthetic hydrophilic membranes and method for their manufacture are also disclosed in U.S. Pat. No. 5,246,582. Membranes in the form of hollow fibers or flat membranes for dialysis and/or ultrafiltration are disclosed which contain a mixture of 65 to 95 wt. % sulfonated polysulfone, e.g., as a salt of sulfonic acid, and 35 to 5 wt. % unsulfonated polysulfone. Up to 12 wt. % of water-soluble polymers, based on the total mixture, are added to the mixture of polysulfone and sulfonated polysulfone before formation of the membrane.

U.S. Pat. No. 5,879,554 discloses a synthetic membrane consisting of a mixture of polysulfone, sulfonated polysulfone, and not more than 20 wt. % of other polymers, wherein the mixture contains 0.5 to 8 wt. % sulfonated polysulfone, e.g., as the salt of sulfonic acid. The method for manufacturing this synthetic membrane involves the addition of one or more solvents to the polymer mixture to form a polymer solution, which is shaped and precipitated to form a membrane in a precipitating bath by means of one or more precipitating agents.

Various disclosures address the use of acid-type solvents for making membranes. For example, U.S. Pat. No. 5,997,741 contains disclosures concerning the use of a sulfuric acid solvent for making non-sulfonated polyetheretherketone membranes.

A microporous polyetheretherketone (PEEK) membrane prepared without sulfonating the PEEK polymer is also disclosed in U.S. Pat. No. 4,992,485. Membranes, fibers and articles are prepared from solutions of PEEK in non-sulfonating acid solvents, e.g., methane sulfonic acid and trifluoromethane sulfonic acid. Use of sulfuric acid as a diluent in non-sulfonating amounts is also disclosed. The PEEK membranes are used as supports for composite ultrafiltration and reverse osmosis membranes.

Regarding the use of sulfonating solvents, e.g., concentrated sulfuric acid, for making membranes, the literature contains disclosures of the use of such solvents in the preparation of Kevlar™ membranes. In MAKU 17(2), 78–84 (in Japanese, see Chemical Abstracts Reference No. 117:28235), a method of preparing such membranes is disclosed. In the method, 1.0 to 3.0% Kevlar™ 29 is dissolved in 97% $H_2SO_4$ at 50° C. For example, 2.0% poly-phenylene terephthalamide is dissolved in 99.7% $H_2SO_4$, after which a membrane is cast from solution then moisturized and/or heated to convert the anisotropic structure to an isotropic structure, followed by a coagulation step and the removal of solvents and moisture.

U.S. Pat. No. 3,869,429 also includes disclosures relating to the preparation of Kevlar™ films using, e.g., sulfuric acid, as a dope solvent.

There is, however, no disclosure in the prior art of using acid dopes for making membranes from sulfonated polymers, more specifically, for making membrane from solely sulfonated polyethersulfones. Indeed, all references to membrane specifically concern mixtures of sulfonated polyethersulfones with polyethersulfones or the like. Moreover, there are no disclosures of only sulfonated polyethersulfones with non-aryl-sulfonate polymers.

SUMMARY OF THE INVENTION

In one aspect of the invention, a hydrophilic, cast polymer matrix is provided, wherein the matrix comprises a sulfonated polyarylsulfone or polyarylethersulfone. The polymer is sulfonated in solution using a sulfonating acid solvent. The polyarylsulfone or polyarylethersulfone may be sulfonated on up to about every third aromatic ring. The matrix may additionally comprise up to about 90 wt. % of a substantially non-sulfonatable polymer, such as polyvinylpyrrolidone, polyethyleneglycol, non-aryl polysulfone, non-aryl polyethersulfone, poly-paraphenylene terephthalamide, polyetherketone, and mixtures thereof.

In another aspect of the present invention, the matrix is selected from a porous matrix, a non-porous matrix, and a membrane having flow channels. The membrane may comprise a flat sheet ranging from 50 to 1000 μm in thickness. Pores of at least one surface, when present, may have an average diameter of between about 0.01 μm to about 50 μm. The support region of the matrix may comprise one or more structures selected from closed cell pores, open cell pores, macrovoids, finger structures, and mixtures thereof.

In a further aspect of the present invention, a method of forming a sulfonated aryl sulfonate polymer article is provided. The method comprises dissolving an aryl sulfonate polymer in a sulfonating acid solvent; casting the polymer solution into the shape of the article; and coagulating the article in a coagulation bath. The method may include additional steps, including neutralizing the coagulated article in a neutralization bath, rinsing the coagulated article in a rinsing bath, and drying the coagulated article. The sulfonating acid solvent may comprise sulfuric acid, e.g., concentrated sulfuric acid.

DETAILED DESCRIPTION OF THE PREFERRED EMBODIMENT

Figure 1:
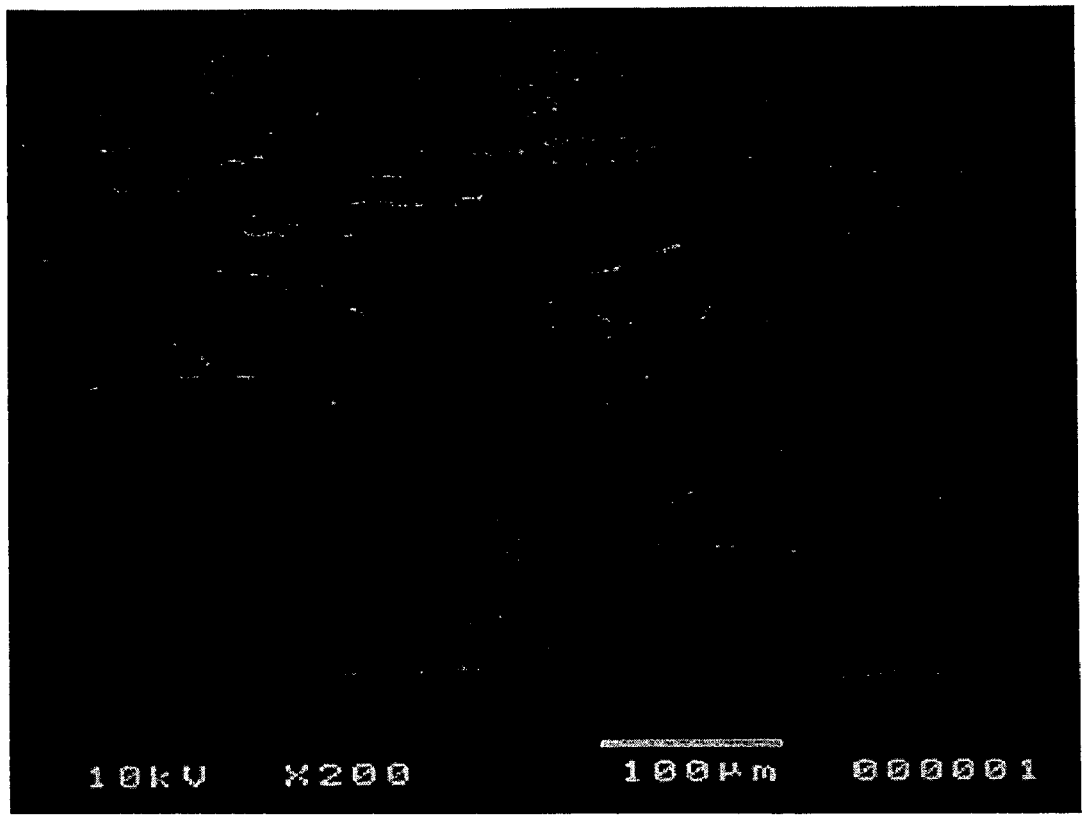
FIG. 1 is a scanning electron microscope photomicrograph of the closed cell polyethersulfone membrane prepared according to the method of Example 1.

The following description and examples illustrate a preferred embodiment of the present invention in detail. Those of skill in the art will recognize that there are numerous variations and modifications of this invention that are encompassed by its scope. Accordingly, the description of a preferred embodiment should not be deemed to limit the scope of the present invention.

Introduction

Using a strong sulfonating acid as a solvent, aryl sulfonate polymers, or mixtures of aryl sulfonate polymers and other polymers like polyvinylpyrrolidone (PVP) can be dissolved to make dopes of sulfonated aryl sulfonate polymers or dopes of sulfonated aryl sulfonate polymers with other polymers. By casting these dopes in coagulation baths of different compositions, porous matrices of sulfonated aryl sulfonate polymers or mixtures of these with other polymers can be produced directly. These matrices, defined as materials having a polymer phase and a void phase, have a range of structures depending on the composition of the dope and the coagulation bath. These structures include closed cells, open cells with a gradation of pores from one side to the other (gradation includes from small to very large), or finger-type structures (controlled macrovoids). In some embodiments, one surface of these matrices may have no pores (when viewed by SEM), or it may have pores up to 20 μm or more in size. The other surface can have pores of similar size or larger. These matrices are hydrophilic, and can be permeable or nonpermeable.

The Sulfonating Solvent

Any suitable strong sulfonating acid may be used as the solvent, e.g., sulfuric acid, sulfonic acid, chlorosulfonic acid, or oleum or fuming sulfuric acid (i.e., sulfur trioxide in concentrated sulfuric acid). Mixtures of sulfonating acids may also be used, e.g., mixtures of sulfonic and concentrated sulfuric acid. In a preferred embodiment, the strong sulfonating acid is sulfuric acid. The concentration of the sulfuric acid preferably ranges from 75% to 100%. Fuming sulfuric acid, because of its efficiency as a sulfonating acid, may be used at slightly lower concentrations. Most preferably, the sulfuric acid is in concentrated form, i.e., 98% $H_2SO_4$ available from Sigma-Aldrich. In a preferred embodiment, ACS Reagent Grade acid is used. If sulfonating acids other than sulfuric acid are used, they are preferably used in as concentrated a form as is possible.

In general, the higher the concentration of the sulfonating solvent in the casting solution, the thinner the structures produced. Lower concentrations of sulfonating solvent tend to produce thicker, closed structures.

The Polymer

The aryl sulfonate polymer of a preferred embodiment includes such aryl sulfonates as polyethersulfone (available from BASF under the trade name "Ultrason E") and polysulfone (available from BASF under the trade name "Ultrason S"). Other suitable aryl sulfonate polymers that may be used include polyarylene etherethersulfone, polyarylene ethersulfone, polyarylenepropylenearylene etherether sulfone, polyaryl sulfones, polyaryl ether sulfones, polyaryl ether ketones, poly ether ether ketones, polystyrene, and copolymers of such.

In general, at high concentrations of sulfonated polymer in the casting solution, thicker, closed structures are produced. Lower concentrations of sulfonating solvent tend to produce thinner structures.

In one aspect of a preferred embodiment, one or more additional substantially non-sulfonatable polymers may also be present. Examples of such polymers include non-aryl polysulfone, non-aryl polyethersulfone, Kevlar™, polyetherketone, polyvinylpyrrolidone (PVP K value (intrinsic viscosity) 10 up to K value 360, available from Sigma Aldrich) and polyethylene glycol (100 to 400 molecular weight). If polyvinylpyrrolidone is used, a more open matrix structure is generated. Such substantially non-sulfonatable polymers may form up to 90% of the polymer mixture.

In general, at higher concentrations of the non-sulfonatable polymer in the casting solution, more open structures, or finger structures, are produced. At lower concentrations of non-sulfonatable polymer, more closed structures, or cell structures, tend to be produced.

Additional Additives

Other additives typically used in membrane production may also be used. Such additives include alcohols (such as ethanol), acid non-degrading organic solvents (such as polar solvents), and alkali metal halides (such as NaCl and LiCl). Non-solvents (for the polymers) may also be added. In general, when higher concentrations of non-solvent are used, a more open structure and a denser skin are produced. Lower concentrations result in more closed structures and less dense skin. Up to about 10 g/l of solid additives and up to about 10 wt. % liquid additives are typically added to the polymer dopes. However, depending upon the additive and other components present in the polymer dope, higher additive levels may be suitable.

Preparation of Polymer Dopes

Polymer dopes are prepared in a preferred embodiment by dissolving one or more polymers and, optionally, one or more additives in a sulfonating acid, then casting the resulting solution to produce a film. In one aspect of a preferred embodiment, the polymer consists of only one or more aryl sulfonate polymers. However, additional polymer different from aryl sulfonate polymer may also be present. If a different polymer is present, the weight ratio of aryl sulfonate polymer to different polymer is preferably 100:1 to 1:100, more preferably 10:1 to 1:10, especially preferably 5:1 to 1:5. Preferably, the weight ratio of polymer to additive ranges from 10:1 to 1:10, more preferably 5:1 to 1:5.

After the polymer and additives are mixed together, the sulfonating acid is added. Preferably, 99 parts by weight to 55 parts by weight of the sulfonating acid, in concentrated form, are used to dissolve 1 to 45 parts by weight of polymer. More preferred, 95 to 75 of the sulfonating acid, in concentrated form, are used to dissolve 5 to 25 parts by weight of polymer. If the sulfonating acid is in diluted form, additional acid may be required to dissolve the same quantity of polymer. Generally, at low acid concentration (75–80%), less sulfonation occurs, coagulation is faster, and a "tighter", i.e., less porous surface is produced. Most preferably, the sulfonated acid constitutes concentrated sulfuric acid, 95 to 99 weight percent of which is preferably used to dissolve 7 to 12 weight percent of the polymer. Preferably, the mixing is conducted at room temperature.

The mixture of polymer, additives and sulfonating acid is heated to a temperature of from 25° C. to 95° C., most preferably a temperature of about 75° C. The mixture is then mixed, e.g., in a ball mill, until the polymer is substantially dissolved or dispersed. Typically, 4 to 12 hours is needed for dissolution.

The dissolution of the polymer in the dope appears to be associated with the sulfonation of the polymer. The more sulfonated the polymer, the more water soluble it becomes. Less sulfonated polymer is strongly swollen by water. Shorter sulfonated polymer chains may become soluble more quickly than longer ones. The degree of sulfonation can be limited by stopping the reaction, i.e., by quenching or by using conditions not sufficiently strong to cleave certain bonds in the polymer.

At lower dissolution temperatures, longer time is required to prepare a homogeneous solution, and the resultant polymer concentration is lower, with consequential effects in membrane or matrix structure, as discussed above. Another effect of lower dissolution temperature is that the resultant matrices or membranes appear to be less hydrophilic. Generally, at temperatures below 25° C., no polymer is dissolved in the solution. However, under certain conditions polymer may be dissolved in solution at temperatures below 25° C.

Preparation of Matrices from Polymer Dopes

The polymer dopes as describe above may be cast into porous matrices, non-porous matrices or membrane matrices using any conventional procedure wherein the casting solution is spread in a layer onto a nonporous support from which the matrix later can be separated after coagulating. The matrices can be cast manually by being poured, cast, or spread by hand onto a casting surface followed by application of a coagulation liquid onto the casting surface. Alternatively, the matrices may be cast automatically by pouring or otherwise casting the solution onto a moving bed. The temperature of the polymer dope at casting can affect the structure of the resulting membrane. Generally, the hotter the dope, the more graded the structure produced.

One type of moving belt support is polyethylene coated paper. In casting, particularly in automatic casting, mechanical spreaders can be used. Mechanical spreaders include spreading knives, a doctor blade or spray/pressurized systems. A preferred spreading device is an extrusion die or slot coater which has a chamber into which the casting formulation can be introduced. The casting solution is then forced out of the chamber under pressure through a narrow slot. Matrices may also be cast by means of a doctor blade with a knife gap of typically about 300 microns to 800 microns, more preferably about 500 microns. The relationship between the knife gap at casting and the final thickness of the matrix is a function of the composition and temperature of the casting solution, the duration of exposure to the gaseous environment, such as humid air, the relative humidity of the air during exposure. In addition, the temperature of the coagulation bath and many other factors can affect the overall thickness of the final matrix. Matrices typically shrink upon coagulation or gelling, losing from about 20% to about 80% of their thickness. Casting solution temperatures of between about 20° C. and 80° C. are typically utilized.

Generally, to produce an open cell membrane matrix, the cast film is exposed to a gaseous environment, such as air, sufficiently long to induce formation of relatively large surface pores. Exposure time and exposure conditions that exist between casting and coagulating the casting solution are factors that may affect pore formation. Preferably, the casting solution is exposed to humid air after casting but before coagulation. Relative air humidity is preferably greater than about 60%. However, ambient humidity conditions and relative air humidities less than or equal to about 60% are also acceptable. In addition, the air is preferably circulated to enhance contact with the cast solution.

The exposure time to air is generally from about 0.1 seconds to about 20 seconds. Increasing the air exposure time, over this range, tends to increase permeability of the resulting membrane. Most preferably, the air exposure time is 3 to 10 seconds. In some cases, exposure to the air may not be necessary for pore formation.

Following casting and exposure to a gaseous environment, such as air, the cast solution is coagulated. In a preferred embodiment, coagulation is accomplished by transporting the cast matrix on a moving belt into the coagulation liquid. In the coagulation bath, the polymer coagulates to produce a matrix having the requisite pore and surface structure. In preferred embodiments, the coagulation liquid is water, sulfuric acid or mixtures of the two.

The temperature of the coagulation bath can affect the porosity of the matrix. In general, warmer coagulation baths result in more porous matrices. When colder temperatures are used, a tighter surface and a more regular under-structure is produced, regardless of the resulting structure type, e.g., regular fingers or regular cells are produced. Generally, a wide temperature range can be utilized in the coagulation step, ranging from about 0° C. to 90° C. More preferably, the temperature ranges from about 1° C. to about 60° C. The lower temperature limit is determined by the freezing point of the particular coagulation liquid. Preferably, the coagulation liquid is water and the coagulation temperature is between about 22° C. (or room temperature or slightly above room temperature) and about 40° C. The temperature of the coagulation bath may cause marked changes in the pore diameters of the microporous skin of the membrane and also in its asymmetry. Where higher coagulation temperatures are utilized, the membranes possess both larger skin pores and enhanced asymmetry. Conversely, where lower temperatures are utilized, smaller pores form and asymmetry can be reduced. The pH of the coagulation bath may also affect coagulation time and pore size. Generally, the lower the pH of the coagulation bath, the slower the coagulation and the larger the pore size. The pH of the coagulation bath can range from 1 to 13. Preferably, the pH of the coagulation bath ranges from 1 to 8, more preferably from 5 to 6. The pH may be adjusted by adding a suitable acid or base to the coagulation bath.

Matrices are recovered from the coagulation bath in the conventional manner involving physical removal, neutralizing, washing with deionized water and oven or air drying. Matrices produced by the methods described above may be up to 1000 microns thick, or more. Preferably, the thickness is less than about 300 microns. More preferably, the thickness is about 100 microns. It is well known that several parameters such as polymer solution viscosity, polymer solution flow rate from the casting knife, support belt speed, environmental and coagulation conditions, and the like affect the final thickness. These can all be adjusted to achieve the desired porous matrix, non-porous matrix or membrane matrix. Generally, faster coagulation results in thicker film production.

After the resulting matrix is removed from the coagulation bath, it is transferred to a bath containing a basic solution in order to neutralize any remaining acid. Any suitable solution prepared by dissolving a base in a solvent may be used. In a preferred embodiment, the solution is aqueous sodium carbonate, preferably at a concentration of from 1 to 10 wt. % and at a pH of from 10 to 14. Neutralization may be preceded or followed by one or more rinsing steps, e.g., in a water bath.

It is desirable to ensure that the membrane is completely washed in the neutralization and rinsing steps. Incomplete washing may lead to weakness in the matrix over time, chain scission, or other aging effects. Other possible effects of incomplete washing, usually of a temporary, short-term nature, include leaching during use or affecting the pH of the filtrate.

After neutralization and, optionally, rinsing, the matrix or membrane is dried to expel additional increments of liquid present, e.g., solvent or coagulation liquid. Preferably, if the matrix is in sheet form, it is dried under light tension to prevent shrinkage (i.e., to limit shrinkage to less than 10%). Generally, greater shrinkage (on a percentage basis) is observed for thicker wet matrices or membranes.

The overall properties for the porous matrices or membrane matrices of the present invention may also be varied by varying parameters such as the polymer concentration, sulfonating solvent and additive nature and concentration, relative degree of homogeneity or stability of the casting solution, exposure time to a gaseous environment following casting, coagulation liquid and temperature and other variables as are herein described.

Morphology and Properties of Matrices

Porous matrices, non-porous matrices and membrane matrices may be produced according to the method described above. The support region, i.e., the region between the two surfaces of the matrix, may include structures such as closed cells, isotropic flow channels having substantially constant pore size throughout the thickness of the matrix, isotropic open cells, asymmetric flow channels having increasing pore size from one surface of the matrix to the other, macrovoids, and/or finger structures.

The thicknesses of the matrices may range from about 50 μm to 1000 μm. In a preferred embodiment, the thicknesses of the matrices are preferably less than about 300 μm, more preferably less than about 100 μm. The matrices may have no pores, or pores ranging in size from 0.01 μm to about 50 μm, more preferably up to about 20 μm. Density of pores may range from none to $10^{11}$ pores/mm$^2$ (assuming 100% porosity of 10 nm pores).

The matrices described above are in the form of flat sheets. However, the matrices can be produced in other forms as well, e.g., hollow fibers, tubes, coatings on porous supports, and the like. The processes by which these other forms may be produced are well-known in the art. For example, hollow fibers can be produced by extruding the polymer dope through multiple bore spinnerets, or by coating a porous support with the polymer dope, allowing the dope to penetrate the support, then quenching the dope.

Regarding the extend of sulfonation of the aryl sulfonate polymer in the matrix, up to 100% substitution may be achieved. More preferably, up to about a third of the polymer's repeat units are sulfonated. In a preferred embodiment, the extent of sulfonation is sufficient to substantially alter one or more key properties of the membrane or matrix, e.g., wettability, solubility or ion exchange. Typically, a substantial alteration in one or more of these key properties is observed at sulfonation levels of about 20–30%. However, higher or lower sulfonation levels can also result in alteration of a key property.

The matrices are hydrophilic and wettable with water. Water is observed to penetrate into the matrices.

EXAMPLES 1–5

For each of Examples 1–5, polymer and additive, present in the ratios set forth in Table 1, were added successively to the mixing bottle. Concentrated sulfuric acid was then added at room temperature to the mixture. The mixture was put in a water bath at 75° C. and rotated at 60 rpm for a sufficient time to dissolve all of the added polymer (4 to 12 hours). Upon dissolution, a clear golden yellow viscous solution was obtained for Examples 1 and 5. Examples 2–4, which used PVP, produced cloudy solutions.

The viscous solution was cast onto a glass plate using a casting rod to produce a thin film of constant thickness. The glass plate carrying the film was exposed to air at a relative humidity of 55 to 60% and temperature of 17 to 19° C. for 3 to 290 seconds, then immersed into an aqueous bath at a pH of 6 and temperature of 22° C.

After the coagulated polymer film had separated from the glass, it was transferred to a second bath containing water. After five minutes rinsing in the water bath, the membrane was transferred to a bath containing a 5 wt. % sodium carbonate solution to neutralize the remaining acid. Once the pH of the rinse bath was above 6.5, the membrane was transferred and successively washed in three other water baths.

Figure 2:
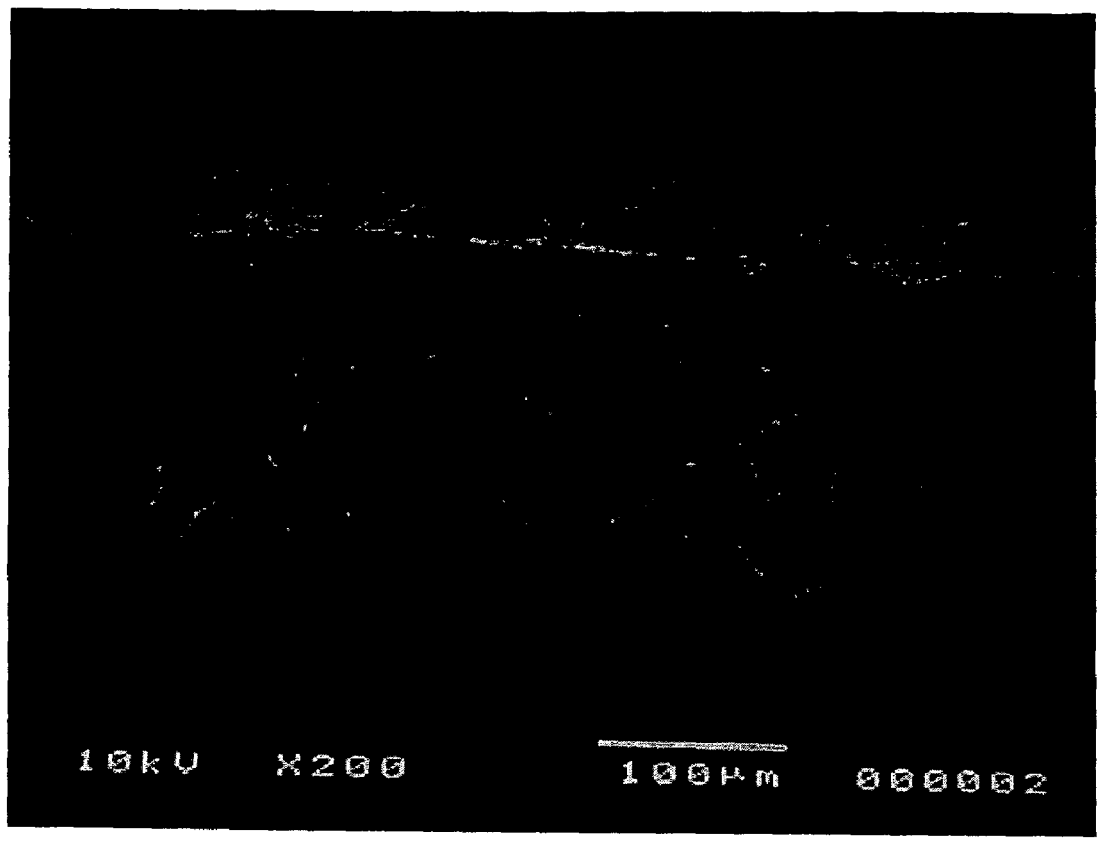
FIG. 2 is a scanning electron microscope photomicrograph of the cross-section of the semi-closed cell membrane produced by the method of Example 2.
Figure 3:
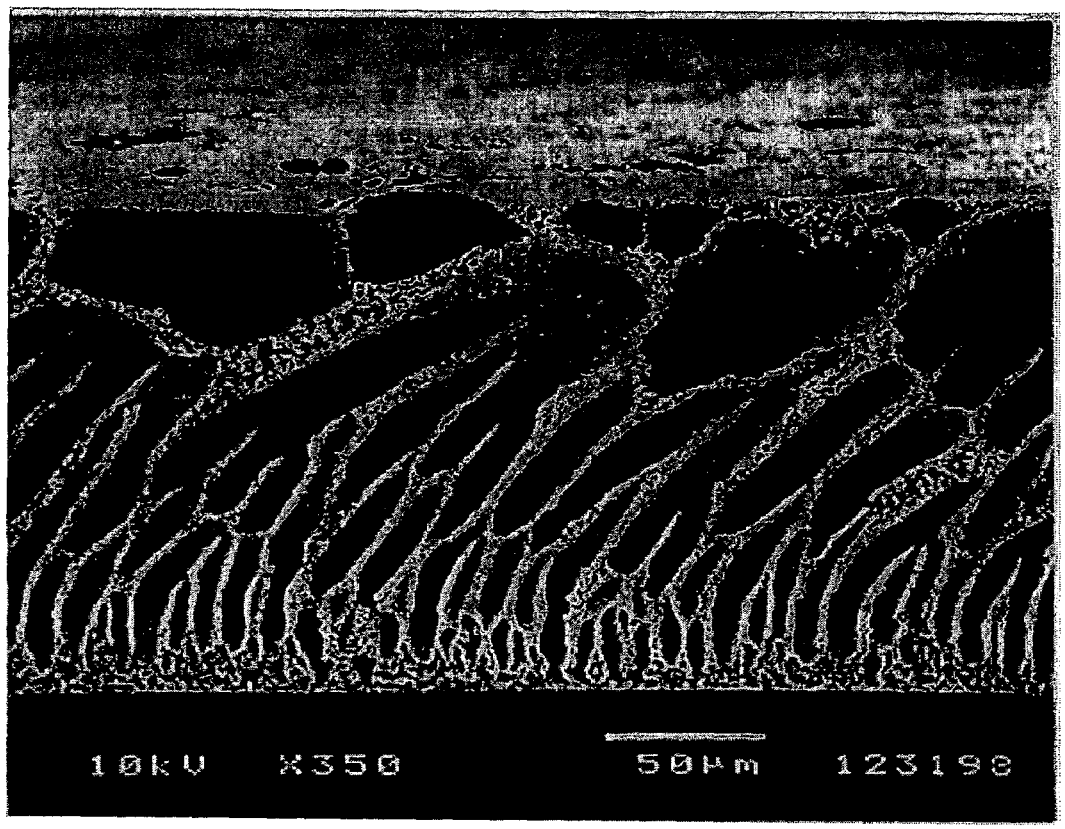
FIG. 3 is a scanning electron microscope photomicrograph of the finger structure membrane prepared according to the method of Example 3.
Figure 4:
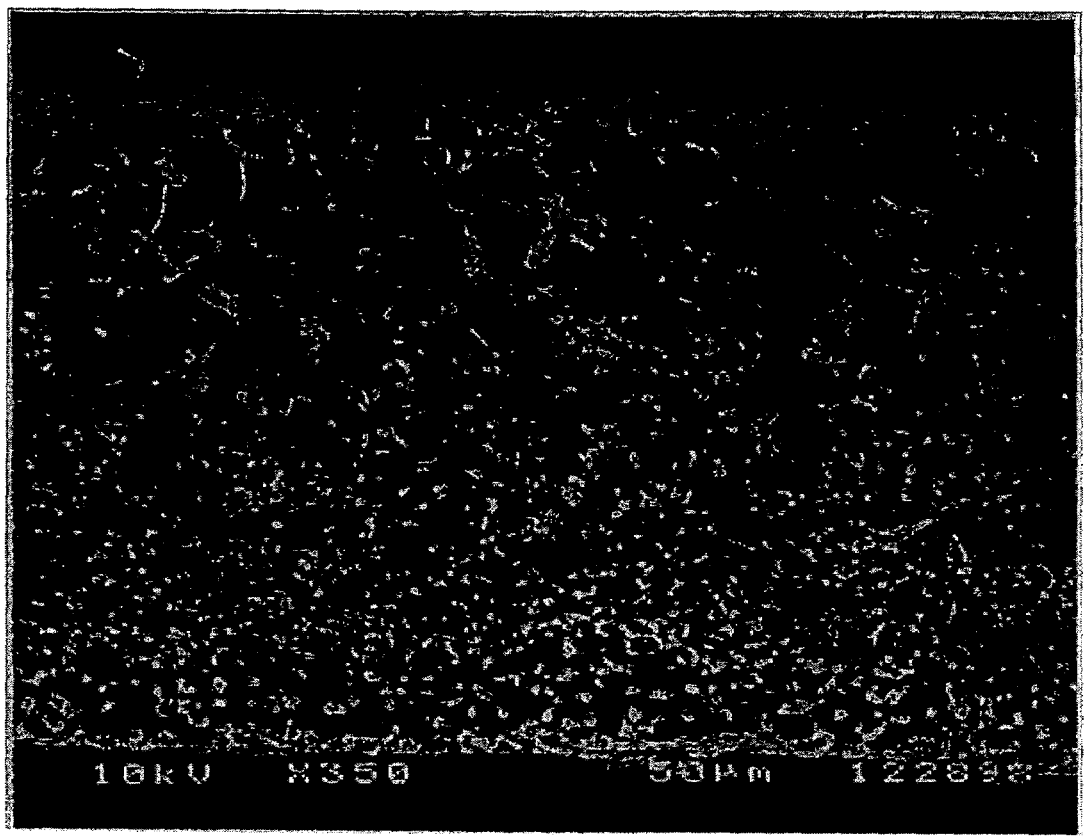
FIG. 4 is a scanning electron microscope photomicrograph of the cross-section of the open cell membrane produced by the method of Example 4.

The membrane was then dried under light tension to prevent shrinkage (<10% allowable), to produce a flat sheet of material. After drying, wetting was tested by contact angle of applied drops of water, and by penetration of the drop. Water drop test results for the membranes of Examples 1–5 are presented in Table 1. SEM images of the membranes prepared in each of Examples 1–4 are presented in FIGS. 1–4.

TABLE 1

| | Ultrason E (wt. %) | PVP (wt. %) | $H_2SO_4$ (wt. %) | Ethanol (wt. %) | Water drop* | Structure SEM attached |
|---|---|---|---|---|---|---|
| Example #1 | 10 | — | 90 | — | S | Closed cell |
| Example #2 | 10 | 5 | 85 | — | P | Semi closed cell |
| Example #3 | 7 | 2 | 81 | 10 | P | Fingers |
| Example #4 | 7 | 5 | 80 | 8 | P | Open cell |
| Example #5 | 10% with 90% DMF - as control | | | | B | — |

*Water beads (B) on surface, spreads over the surface (S), penetrates into the matrix (P)

The above description and examples disclose several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A hydrophilic, cast polymer matrix, the matrix comprising a sulfone polymer, wherein the sulfone polymer is sulfonated in solution using a sulfonating acid solvent, wherein the sulfone polymer is selected from the group consisting of polyarylsulfone, polyarylethersulfone, and mixtures thereof, and wherein the matrix additionally comprises a substantially non-sulfonatable polymer selected from the group consisting of non-aryl polysulfone, non-aryl polyethersulfone, and mixtures thereof.

2. The matrix of claim 1, the polyarylsulfone or polyarylethersulfone comprising a plurality of aromatic rings, wherein less than about one third of the rings are sulfonated.

3. The matrix of claim 1, wherein the substantially non-sulfonatable polymer comprises up to about 90 wt. % of the polymer mixture.

4. The matrix of claim 1, wherein the matrix additionally comprises polyvinylpyrrolidone.

5. The matrix of claim 1, wherein the matrix is selected from the group consisting of a porous matrix, a non-porous matrix, and a membrane matrix.

6. The matrix of claim 5, wherein the matrix comprises a flat sheet.

7. The matrix of claim 6, wherein the sheet is from about 50 to 1000 µm in thickness.

8. The matrix of claim 6, wherein the sheet is less than about 300 µm in thickness.

9. The matrix of claim 8, wherein the sheet is less than about 100 µm in thickness.

10. The matrix of claim 1, wherein the matrix comprises a membrane matrix having flow channels.

11. The matrix of claim 1, wherein the matrix comprises a membrane having a first surface and a second surface, each surface comprising pores therein, the membrane further having a support region between the first and second surfaces, the support region having a plurality of flow channels therein, wherein the pores of the first surface and pores of the second surface are connected via the flow channels.

12. The matrix of claim 11, wherein the pores of at least one surface have an average diameter of between about 0.01 µm and about 50 µm.

13. The matrix of claim 11, wherein the support region comprises one or more structures selected from the group consisting of closed cell pores, open cell pores, macrovoids, finger structures, and mixtures thereof.

14. The matrix of claim 11, wherein the flow channels are substantially constant in diameter throughout the support region.

15. The matrix of claim 11, wherein the flow channels gradually increase or decrease in diameter through the support region in a direction from the first surface to the second surface.

16. The matrix of claim 1, wherein the matrix further comprises polyethyleneglycol.

17. The matrix of claim 1, wherein the matrix further comprises poly-paraphenylene terephthalamide.

18. The matrix of claim 1, wherein the matrix further comprises polyetherketone.

19. The matrix of claim 12, wherein the matrix further comprises polyethyleneglycol.

20. The matrix of claim 12, wherein the matrix further comprises poly-paraphenylene terephthalamide.

21. The matrix of claim 12, wherein the matrix further comprises polyetherketone.

* * * * *